United States Patent
MacLean

(10) Patent No.: US 12,436,682 B2
(45) Date of Patent: Oct. 7, 2025

(54) METHODS AND APPARATUS FOR STORING DATA

(71) Applicant: Arm Limited, Cambridge (GB)

(72) Inventor: Steven Daniel MacLean, Wake Forest, NC (US)

(73) Assignee: Arm Limited, Cambridge (GB)

(*) Notice: Subject to any disclaimer, the term of this patent is extended or adjusted under 35 U.S.C. 154(b) by 140 days.

(21) Appl. No.: 18/092,527

(22) Filed: Jan. 3, 2023

(65) Prior Publication Data

US 2024/0220121 A1 Jul. 4, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 11,573,801 B1* | 2/2023 | Dixon | G06F 9/30036 |
| 2006/0071829 A1* | 4/2006 | Pearlstein | H03M 7/40 |
| | | | 341/67 |
| 2015/0347140 A1* | 12/2015 | Col | G06F 9/30181 |
| | | | 712/233 |
| 2019/0050284 A1* | 2/2019 | Brown | G06F 11/1044 |
| 2019/0179560 A1* | 6/2019 | Moon | G06F 11/1048 |
| 2021/0034567 A1* | 2/2021 | Bringivijayaraghavan | G06F 3/0673 |
| 2022/0374240 A1* | 11/2022 | Maiorano | G06F 11/0751 |
| 2023/0409325 A1* | 12/2023 | Bolbenes | G06F 9/30036 |

\* cited by examiner

*Primary Examiner* — Zhuo H Li
(74) *Attorney, Agent, or Firm* — NIXON & VANDERHYE P.C.

(57) ABSTRACT

Aspects of the present disclosure relate to an apparatus comprising instruction receiving circuitry to receive an instruction to be executed, the instruction being an instruction to write given data to a storage; instruction implementation circuitry to determine a sequence of operations corresponding to said instruction, and execution circuitry to perform the determined sequence of operations. The instruction implementation circuitry is configured to, responsive to the given data having a value of zero, determining the sequence of operations including a first operation for writing one or more zeroes to the storage, the first operation being a dedicated zero-writing operation, and responsive to the given data having a non-zero value, determining the sequence of operations including one or more second operations for writing the non-zero value to the storage, the one or more second operations being different from the first operation.

15 Claims, 6 Drawing Sheets

METHODS AND APPARATUS FOR STORING DATA

BACKGROUND

The present technique relates to the field of processing apparatuses, in particular apparatuses for executing instructions relating to the storage of data. Such an instruction defines data to be written, for example by defining the data that should be stored and a location within a storage at which it is to be stored. Non-limiting examples of such storages include a memory, a cache, a register, and so on.

Storing data in this manner is a common operation performed by many processing apparatuses. For example, a program to be executed comprises a series of instructions and a relatively large portion of such instructions may relate to data storage. Improving the efficiency of such data storage can therefore significantly improve overall processing efficiency and throughput. There is therefore a desire for more efficient ways to write data to a storage.

SUMMARY

At least some examples provide an apparatus comprising:
instruction receiving circuitry to receive an instruction to be executed, the instruction being an instruction to write given data to a storage;
instruction implementation circuitry to determine a sequence of operations corresponding to said instruction, wherein the instruction implementation circuitry is configured to:
responsive to the given data having a value of zero, determining the sequence of operations including a first operation for writing one or more zeroes to the storage, the first operation being a dedicated zero-writing operation; and
responsive to the given data having a non-zero value, determining the sequence of operations including one or more second operations for writing the non-zero value to the storage, the one or more second operations being different from the first operation, and execution circuitry to perform the determined sequence of operations.

Further examples provide a method comprising:
method comprising:
receiving an instruction to be executed, the instruction being an instruction to write given data to a storage;
determine a sequence of operations corresponding to said instruction, said determining comprising:
responsive to the given data having a value of zero, determining the sequence of operations including a first operation for writing one or more zeroes to the storage, the first operation being a dedicated zero-writing operation; and
responsive to the given data having a non-zero value, determining the sequence of
operations including one or more second operations for writing the non-zero value to the storage, the one or more second operations being different from the first operation, and performing the determined sequence of operations.

Further examples provide a non-transitory computer-readable medium to store computer-readable code for fabrication of an apparatus as described above.

Further aspects, features and advantages of the present technique will be apparent from the following description of examples, which is to be read in conjunction with the accompanying drawings.

DESCRIPTION OF EXAMPLES

Figure 1:
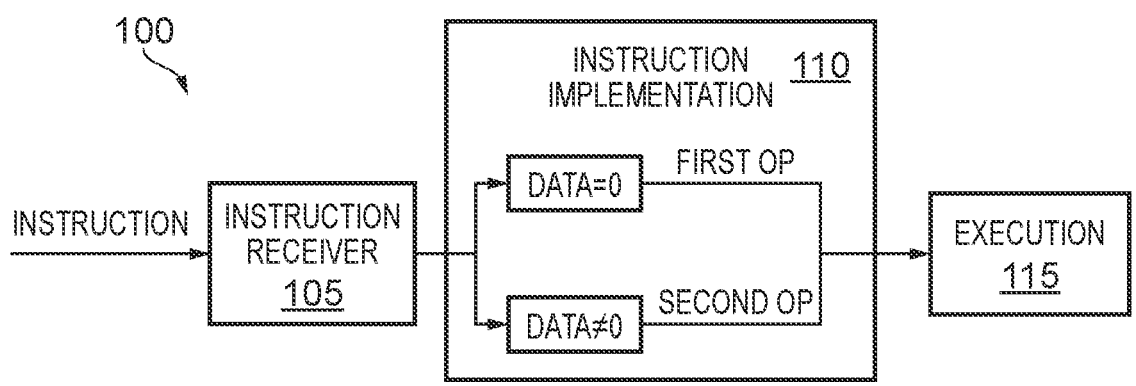
FIG. 1 schematically depicts an apparatus according to an example.

As noted above, in one example an apparatus comprises instruction receiving circuitry, instruction implementation circuitry and execution circuitry. These circuitry elements, and also other circuitry elements described below, may be implemented in dedicated circuitry, for example as physical components of a processing apparatus such as a central processing unit or graphics processing unit. Alternatively, some or all of the circuitry elements may be implemented as conceptual units of more general-purpose circuitry, for example as functionality implemented by a general-purpose processor.

The instruction receiving circuitry receives an instruction to be executed. For example, the instruction may be retrieved from a storage such as a memory or an instruction cache. The instruction forms part of a sequence of instructions to be executed in sequence, which may together define a program that is being executed by the apparatus. This instruction is an instruction to write given data to a storage, such as a memory, data cache, and/or a register. For example, it may define the data to be written, and a location (e.g. a memory address or register ID) within the storage at which the writing is to be performed. The data may have a value of zero, i.e. a series of one or more zeroes with no non-zero bits. Alternatively, the data may have a non-zero value comprising a series of bits including at least one non-zero bit. In a particular example, the instruction is a memset instruction.

The instruction implementation circuitry is configured to determine a sequence of operations, which may for example be micro-operations, corresponding to the instruction. These operations, when executed by the execution circuitry, have the effect of causing the instruction to be performed. For example, where the instruction defines data to be written and a location for writing, the series of operations may individually define the specific steps that should be taken by the execution circuitry to actually write the data at the defined location. In some examples, the instruction identifies specific architectural registers which, in turn, contain the data to be written and the location within a further storage (e.g. a cache or memory) to which the data is written. The instruction may further identify a register containing the number of bytes to be written.

The instruction implementation circuitry performs different actions based on whether or not the given data has a value of zero (or, more generally, has a value equal to a sequence of zeroes of a given length). If the given data has a value of zero, the instruction implementation circuitry determines the sequence of operations including a first operation for writing one or more zeroes to the storage, the first operation being a dedicated zero-writing operation.

Conversely, if the given data has a non-zero value (or, more generally, the given data has a value equal to a sequence having at least one non-zero element), the instruction implementation circuitry determines the sequence of operations including one or more second operations for writing the non-zero value to the storage, the one or more second operations being different from the first operation. The one or more second operations may be general-purpose operations which are not dedicated zero-writing operations.

Following determination of the sequence of operations, the execution circuitry performs the determined sequence of operations and thereby causes the given data to be written to the storage.

Thus, general-purpose operations are used to write non-zero values, but a dedicated zero-writing operation is used to write zero-value data. For example, the instruction implementation circuitry may be responsive to the given data having a non-zero value to not include the first operation in the sequence of operations. The inventors have observed that, for general programs, in particular those using the C standard library function "memset", a relatively high fraction of write instructions are for the writing of zero-value data. Thus, the provision of a dedicated zero-writing operation (which can be optimised specifically for writing zeroes) provides significantly improved efficiency when compared against comparative examples in which general-purpose operations are used to write all data values (including zeroes).

The first operation may be an operation to write a given number of zeroes to a location in the storage, the location being identified in the instruction. This operation may be an optimised operation for writing zeroes, thereby improving efficiency in the (common) situation in which zeroes are written. For example, the first operation may be a zero-by-virtual address (ZVA) operation. ZVA operations provide an efficient way of writing a number of zeroes at a given virtual address. This therefore provides an effective way of writing zeroes, in a manner more efficient than the use of general-purpose writing operations.

This efficiency is particularly evident in examples in which the execution circuitry includes functionality which is optimised for performing ZVA operations, e.g. in other contexts. Such functionality can thus be used to efficiently write zeroes in the present context, without further increasing the complexity of the apparatus and associated computational overhead. As an example, the execution circuitry may comprise ZVA circuitry optimised to perform ZVA operations. The execution circuitry is consequently configured to perform the first operation using the ZVA circuitry.

In an example, the first operation has a first maximum write size, corresponding to a maximum number of zero bits that can be written by a single instance of the first operation. Similarly, the one or more second operations have a second maximum size, corresponding to a maximum number of bits that can be written by a single instance of the one or more second operations. The first maximum write size is larger than the second maximum write size. Thus, efficiency is improved by way of the larger number of zeroes that can be written in a single instance of the first operation.

In an example, the instruction implementation circuitry is configured to determine the sequence of operations responsive to a predicate of the given data value, such that the sequence of operations includes the first operation if the given data is predicted to have a value of zero, or includes the one or more second operations if the given data is predicted to have a non-zero value. The sequence of operations can thus be determined before the actual data value is known, thereby improving throughput relative to a comparative example in which the determination of the sequence of operations is delayed until the value is actually determined. The execution circuitry can further be configured to initiate performing the determined sequence of operations prior to the determination of the actual data value.

In one such example, the apparatus is responsive to a determination that the given data value is not equal to the predicted data value to cease, by the execution circuitry, performance of the determined sequence of operations. The instruction implementation circuitry determines a corrected sequence of operations, based on the actual determined data value. The execution circuitry then performs the corrected sequence of operations. The apparatus can thus recover from an incorrect prediction.

Examples of the present disclosure will now be described with reference to the drawings. The apparatus elements described below may be implemented as dedicated circuitry units, as logical units implemented by general-purpose processing circuitry, or as a combination thereof.

FIG. 1 schematically shows an apparatus 100 according to an example of the present disclosure. The apparatus may form part of an instruction processing apparatus, such as a central processing unit or graphics processing unit.

The apparatus 100 comprises an instruction receiver 105 which, in operation, receives instructions to be executed. The instructions may be retrieved from a storage, such as a cache or memory. The instructions may form a sequence of instructions which, when executed, cause the apparatus 100 to execute processing tasks such as a program.

The apparatus 100 comprises an instruction implementation unit 110, which is configured to determine a series of processing operations (e.g. micro-ops) corresponding to a given received instruction. For example, a given instruction may be a write instruction, which includes data to be written to a storage (such as a memory, cache, or register), along with information defining where the data is to be written (e.g. a memory address). The instruction implementation unit determines a corresponding series of operations which, when executed in series, cause the data to be written at the defined location. For example, the data may be copied to a register, from which the data is copied to the storage location.

The apparatus 100 comprises an execution unit 115, which is configured to execute the operations determined by the instruction implementation unit and thereby perform each instruction.

Figure 2:
FIG. 2 depicts an example write instruction.

FIG. 2 shows an example write instruction. The instruction comprises instruction information 205, which indicates that the instruction is a write instruction. The instruction then references three registers: a first register reference 210 identifying a register containing the data value to be written, a second reference 215 identifying a register containing an address at which the data is to be written, and a third reference 220 identifying the length to be written.

The instruction can be termed a zero write instruction if the data to be written consists solely of a series of zeroes, i.e. if the register identified by reference 210 comprises a zero value. The instruction can be termed a non zero write instruction if the data to be written is non-zero, i.e. if the register identified by reference 210 comprises a non-zero value.

The apparatus 100 can support multiple different sequences of operations to realise a write instruction. In particular, if the data to be written consists entirely of zeroes, a first operation can be efficiently used. This first operation is optimised for writing zeroes, and can thus write a series of zeroes more efficiently than a general-purpose second operation. Conversely, if the data is non-zero, the general-purpose second operation can be used. The instruction implementation unit 110 is configured to select between the first and second operations based on whether the data to be written has a zero or non-zero value. In some examples, a branch predictor is used to predict aspects of the write. For example, where the write instruction is a memset call, the branch predictor may be used to predict the length of a zero copy portion of the memset operation (i.e. a number of iterations), and a length of a general portion of the operation (i.e. a second number of iterations). These can be supplemented with a predicate which selectively enables and disables writing based on the value of the vector of booleans in the predicate. One skilled in the art will appreciate that many methods are available for predicting such data, for example by extrapolating from patterns of previous data writes.

The inventors have observed that, in many cases, a relatively large fraction of write instructions, in particular memset calls, are instruction to write zeroes. Thus, implementing a dedicated zero-writing operation can significantly improve overall processing performance. For example, the examples described herein can lead to a 2x improvement in throughput for zero write instructions.

Figure 3:
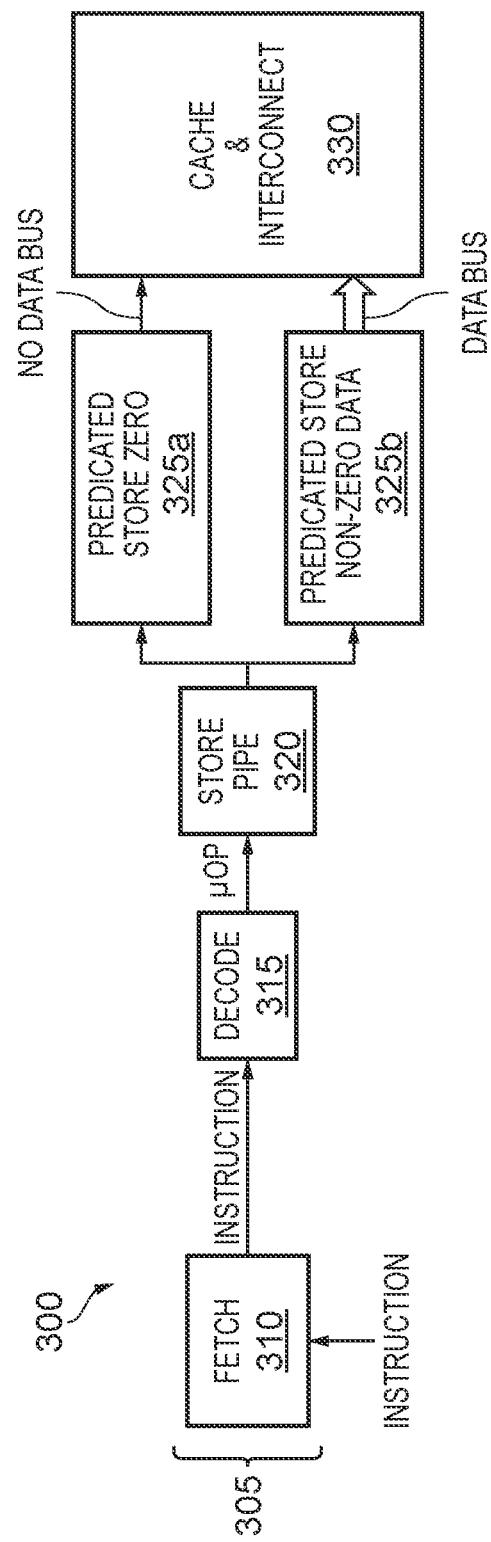
FIG. 3 depicts an apparatus according to an example.

FIG. 3 depicts schematically illustrates an example of a data processing apparatus 300. The data processing apparatus has a processing pipeline 305 which includes a number of pipeline stages. In this example, the pipeline stages include a fetch stage 310 for fetching instructions, e.g. from an instruction cache. A decode stage 315 decodes the fetched program instructions to generate micro-operations (decoded instructions) to be processed by remaining stages of the pipeline. As explained above, a write instruction is decoded into a different series of micro operations based on whether it is predicted to be a zero write or a non-zero write. In particular, a zero write is decoded into a series of micro-operations including a dedicated zero-writing operation, such as a ZVA operation. A store pipe 320 stores decoded micro-operations prior to their execution.

The pipeline then splits into two write instruction execution units, for executing micro-operations corresponding to write instructions. Other execution (not shown) units are configured to perform other operations. If the instruction is expected to write a zero value, predicated zero store unit 325a executes micro-operations to perform the zero write. In an example, the predicated zero store unit includes dedicated ZVA circuitry which is optimised for performing ZVA operations. Conversely, if the instruction is expected to write a non-zero value, the corresponding micro-operations are executed by predicated non-zero store unit 325b, which is a general-purpose writing execution unit for writing arbitrary data values.

Signals corresponding to the operations are then sent to cache and interconnect 330. In contrast with comparative examples in which all-zero cache write-backs can be compressed, the present signals refer to operations at the instruction level. For example, information describing the data to be stored may be sent, via the interconnect 330, to a memory in which the data is to be stored. Predicated non-zero store unit 325b is connected to the cache 330 via a data bus, on which data values to be stored can be transmitted. Predicated zero store unit 325a, on the other hand, is not connected via a data bus, as no data values are to be transmitted therefrom (as the predicated zero store unit 325a only writes zeroes). Significant reduction in processing overhead, and consequent power consumption, can thereby be achieved.

The processing pipeline 305 may comprise further stages. For example: an issue stage for checking whether operands required for the micro-operations are available in a register file and issuing micro-operations for execution once the required operands for a given micro-operation are available; an execute stage for executing data processing operations corresponding to the micro-operations, by processing operands read from the register file to generate result values; and a writeback stage for writing the results of the processing back to the register file. It will be appreciated that this is merely one example of possible pipeline architecture, and other systems may have additional stages or a different configuration of stages. In some examples, there may be a one-to-one relationship between program instructions decoded by the decode stage 315 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

Various other execution units may be included as part of an execute stage, for executing different classes of processing operation. For example the execution units may include an arithmetic/logic unit (ALU) for performing arithmetic or logical operations; a floating-point unit for performing operations on floating-point values, a branch unit for evaluating the outcome of branch operations and adjusting the program counter which represents the current point of execution accordingly; and a more general load/store unit for performing load/store operations to access data in a memory system. Other implementations may have a different set of processing units or could include multiple instances of the same type of processing unit so that multiple micro-operations of the same type can be handled in parallel. It will be appreciated that FIG. 3 is merely a simplified representation of some components of a possible processor pipeline architecture, and the processor may include many other elements not illustrated for conciseness, such as branch prediction mechanisms or address translation or memory management mechanisms.

In examples, the above-described apparatuses provide a hardware implementation of FEAT_MOPS. In such examples, the implementation-defined sizes SETPreSizeChoice(toaddress, setsize, is_setg) and SETPostSizeChoice(toaddress, setsize, is_setg) may be partially predicated based on the data to be written, such that if data 1=0 then SETM stagesetsize=0, and if data==0 then SETM stagesetsize is the maximum integer multiple of SETSizeChoice(toaddress, setsize, 1). In this example, SETM sets by using a dedicated store zero mechanism (e.g. ZVA) and SETP and SETE write by a general-purpose store mechanism.

Figure 4:
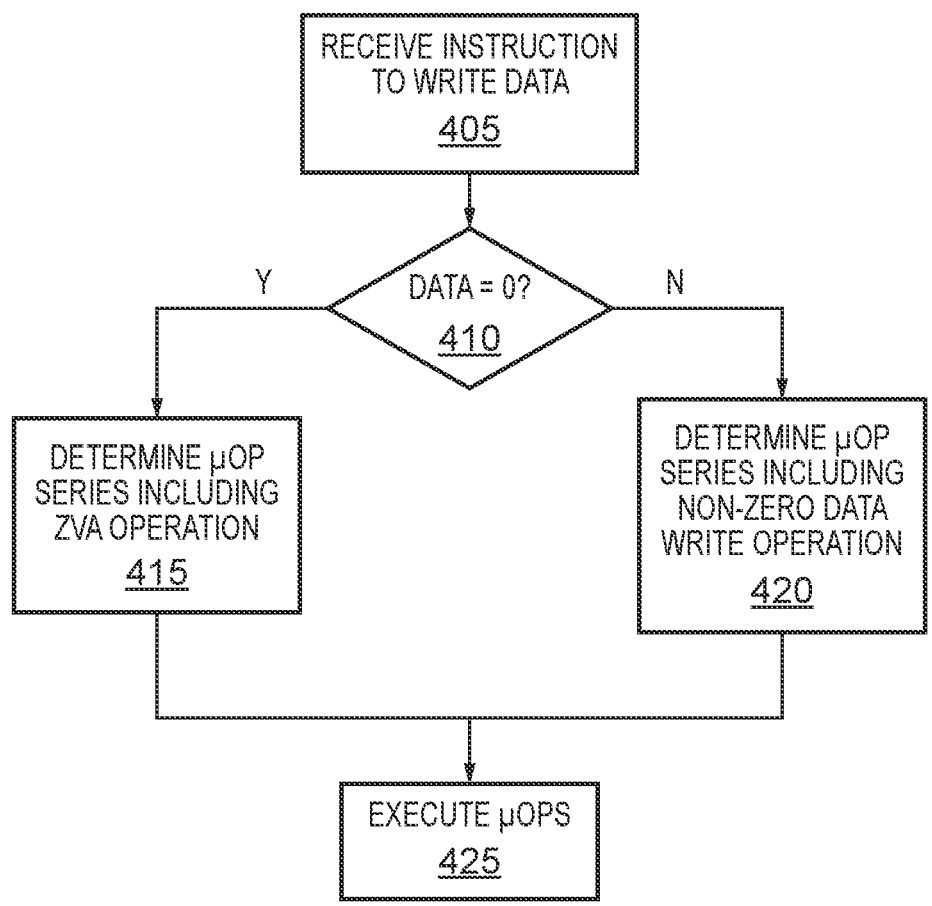
FIGS. 4, 5A and 5B depict example methods.

For example, the SET routines may be implemented as follows for zero and non-zero data writes:
SET with Data==0
    SETP
      Set up to 64 B
      enforce 64 B alignment
    SETM
      Iterative process
      Uses DC ZVA w/predicate
      Set up to 128 B/iteration
      Finish when remaining size becomes 648 or less SETE
    Set up to 64 B
SET with Data 1=0
    SETP
        Set up to 64 B
        enforce 64 B alignment
    SETM
        DO NOTHING IF DATA 1=0
    SETE
        Iterative process
        Set up to 64 B/iteration FIG. 4 depicts a method according to an example, which may for example be implemented by the apparatuses of FIG. 1 or 3.

At block 405, a data write instruction is received.

At block 410, it is determined whether the data to be written is zero or non-zero.

If the data is zero, flow proceeds to block 415 where a series of micro-ops is determined, to implement the zero write. This instruction includes a zero-by-virtual-address, ZVA operation. ZVA operation are dedicated zero-writing operation, which are more computationally efficient than arbitrary write operations. This is particularly evident in examples which comprise dedicated ZVA functionality. For example, the execution unit 115 described above may comprise dedicated ZVA circuitry or logic, for efficient execution of ZVA operations. The series of micro-ops thus includes a ZVA operation to write the received zero value.

Conversely, if the data is non-zero, flow proceeds to block 420 where a series of micro-ops is determined, to implement the non-zero write. This series of micro-ops thus includes a non-zero data write operation.

Finally, at block 425, the determined series of micro-ops is executed.

Figure 5A:
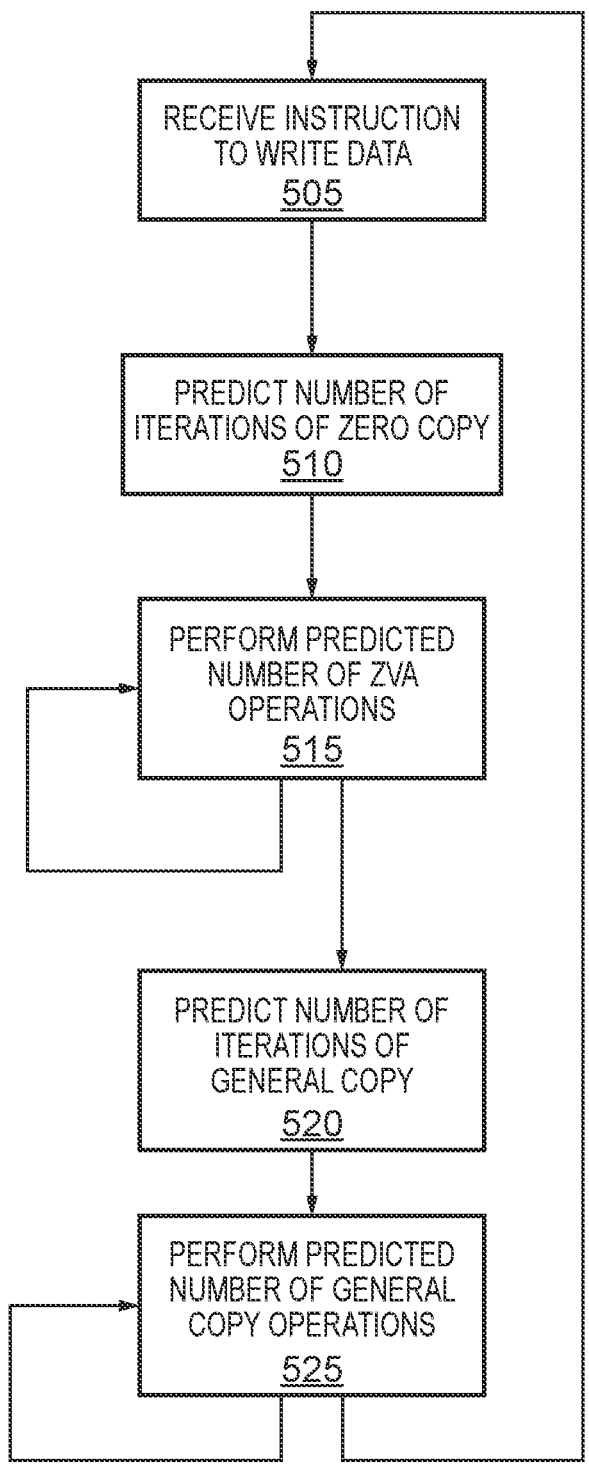

FIG. 5A depicts a method according to an example. The method may for example be performed by the apparatus of FIG. 1 or 3.

At block 505 a write instruction is received.

At block 510, a prediction is made of a number of iterations of a zero copy operation which will be performed as part of executing the write instruction.

At block 515, the predicted number of zero copy operations are performed as ZVA operations. This step is looped until the predicted number of operations have been performed.

At block 520, a prediction is made of a number of iterations of general (i.e. non-zero-specific) copy operations which will be performed as part of executing the write instruction.

At block 525, the predicted number of general copy operations is performed. This step is looped until the predicted number of operations have been performed.

One skilled in the art will appreciate that steps 510-515 and 520-525 can be performed in parallel or in sequence.

Flow then returns to block 505, where a new instruction is received. The present method thus allows for efficient execution of instructions, in particular where a relatively large fraction of the instructions comprise zero write operations (which can be efficiently performed by way of ZVA operations).

Figure 5B:
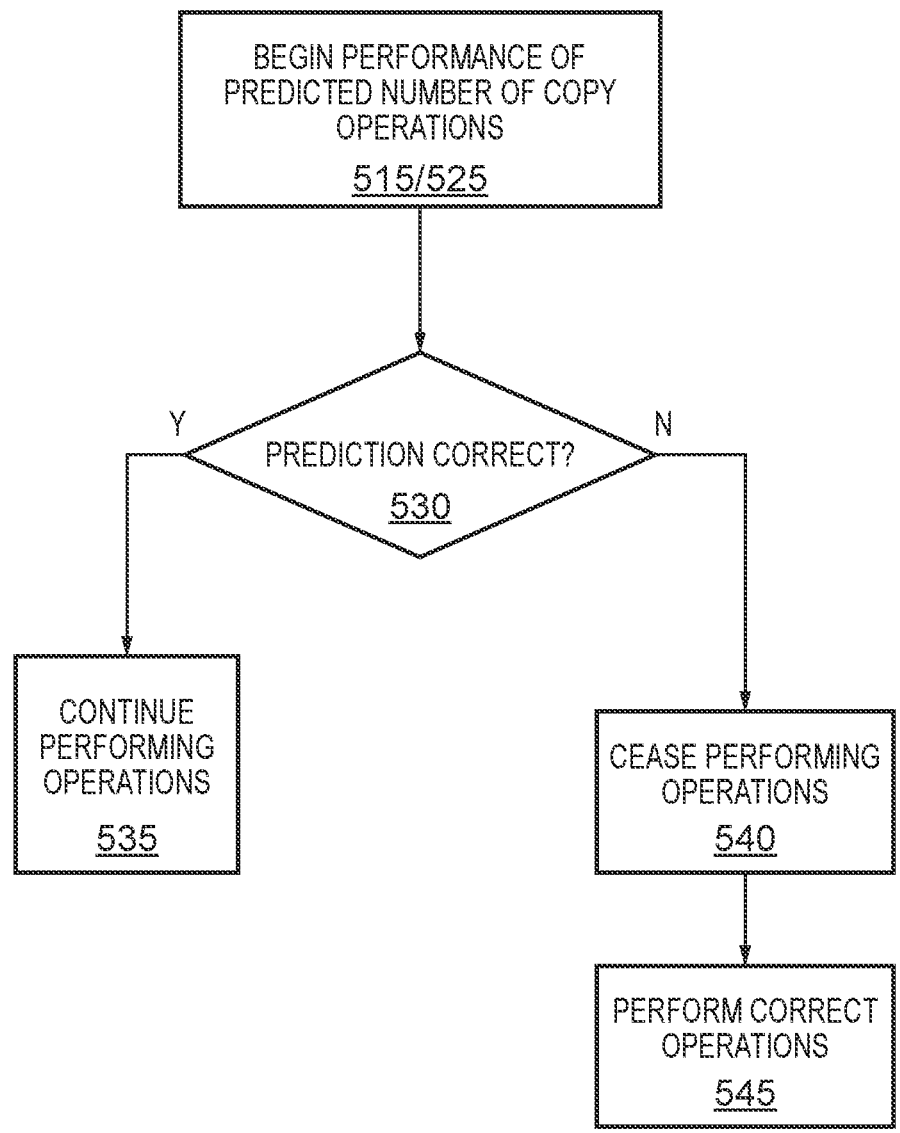

FIG. 5B depicts a method which may be performed in combination with the method of FIG. 5A.

At the beginning of FIG. 5B, performance begins of a predicted number of zero/general copy operations, corresponding to blocks 515 and 525 of FIG. 5A.

At a later time, as shown in block 520, it is determined whether the actual data value and/or copy length matches the predictions such that he determined operations can still be usefully performed. For example, an actual number of zero copy operations corresponding to the instruction may be determined. This may for example occur after the actual data to be written is determined (for example as an output of a preceding operation).

If the prediction was correct, flow proceeds to block 535 where performance of the predicted operations continues.

Conversely, if the prediction was incorrect, flow proceeds to block 540 where performance of the predicted operations ceases. A corrected series of operations, corresponding to a write of the actual data value, is then determined and performed at block 545.

The present example can thus make use of the predictions where they are accurate, but effectively and efficiently correct the flow of operation if the prediction is determined to be inaccurate.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 6:
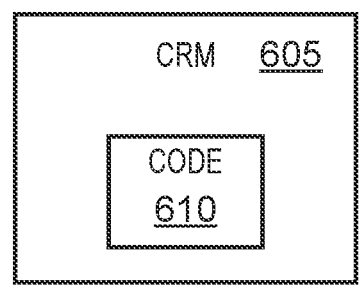
FIG. 6 depicts a computer-readable medium according to an example.

Such an example is shown in FIG. 6, which depicts a computer-readable medium 605 comprising code 610 for fabrication of an apparatus as described above.

Apparatuses and methods are thus provided for providing more efficient writing of data, in particular zero-value data.

From the above description it will be seen that the techniques described herein provides a number of significant benefits. In particular, instruction throughput is significantly improved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the disclosure are set out in the following numbered clauses:

1. An apparatus comprising:
   instruction receiving circuitry to receive an instruction to be executed, the instruction being an instruction to write given data to a storage;
   instruction implementation circuitry to determine a sequence of operations corresponding to said instruction, wherein the instruction implementation circuitry is configured to:
      responsive to the given data having a value of zero, determining the sequence of operations including a first operation for writing one or more zeroes to the storage, the first operation being a dedicated zero-writing operation; and
      responsive to the given data having a non-zero value, determining the sequence of operations including one or more second operations for writing the non-zero value to the storage, the one or more second operations being different from the first operation, and execution circuitry to perform the determined sequence of operations.

2. An apparatus according to clause 1, wherein the first operation is an operation to write a given number of zeroes to a location in the storage, the location being identified in the instruction.

3. An apparatus according to clause 2, wherein the first operation is a zero-by-virtual-address, ZVA, operation.

4. An apparatus according to clause 3, wherein:
   the execution circuitry comprises zero-by-virtual address, ZVA, circuitry optimised to perform ZVA operations; and
   the execution circuitry is configured to perform the first operation using the ZVA circuitry.

5. An apparatus according to any of clauses 2 to 4, wherein the first operation is an optimised operation for writing zeroes.

6. An apparatus according to any preceding clause, wherein the instruction implementation circuitry is responsive to the given data having a non-zero value to not include the first operation in the sequence of operations.

7. An apparatus according to any preceding clause wherein:
   the value of zero is equal to a series of one or more zeroes, with no non-zero bits; and
   the non-zero value comprises a series of bits, at least one said bit being non-zero.

8. An apparatus according to any preceding clause, wherein:
   the first operation has a first maximum write size, corresponding to a maximum number of zero bits that can be written by a single instance of the first operation;
   the one or more second operations have a second maximum size, corresponding to a maximum number of bits that can be written by a single instance of the one or more second operations; and
   the first maximum write size is larger than the second maximum write size.

9. An apparatus according to any preceding clause, wherein:
   the instruction implementation circuitry is configured to determine the sequence of operations responsive to a predicate of the given data value, such that the sequence of operations includes the first operation if the given data is predicted to have a value of zero, or includes the one or more second operations if the given data is predicted to have a non-zero value; and
   the execution circuitry is configured to initiate performing the determined sequence of operations prior to a determination of the given data value.

10. An apparatus according to clause 9, wherein the apparatus is responsive to a determination that the given data value is not equal to the predicted data value to:
    cease, by the execution circuitry, performing the determined sequence of operations;
    determine, by the instruction implementation circuitry, a corrected sequence of operations; and
    perform, by the execution circuitry, the corrected sequence of operations.

11. An apparatus according to any preceding clause, wherein the instruction is a memset instruction.

12. An apparatus according to any preceding clause, wherein the instruction is a FEAT_MOPS instruction.

13. An apparatus according to any preceding clause, wherein each said operation comprises one or more micro-operations.

14. A method comprising:
receiving an instruction to be executed, the instruction being an instruction to write given data to a storage;
determine a sequence of operations corresponding to said instruction, said determining comprising:
responsive to the given data having a value of zero, determining the sequence of operations including a first operation for writing one or more zeroes to the storage, the first operation being a dedicated zero-writing operation; and
responsive to the given data having a non-zero value, determining the sequence of operations including one or more second operations for writing the non-zero value to the storage, the one or more second operations being different from the first operation, and performing the determined sequence of operations.

15. A non-transitory computer-readable medium to store computer-readable code for fabrication of an apparatus according to any of clauses 1 to 13.

We claim:

1. An apparatus comprising:
instruction receiving circuitry configured to receive an instruction to be executed, the instruction being an instruction identifying given data to be written to a storage;
instruction implementation circuitry configured to determine a sequence of operations corresponding to said instruction, wherein the instruction implementation circuitry is configured to:
responsive to the given data identified by said instruction having a value of zero, determine the sequence of operations corresponding to said instruction to include a first operation for writing one or more zeroes to the storage, the first operation being a dedicated zero-writing operation; and
responsive to the given data identified by said instruction having a non-zero value, determine the sequence of operations corresponding to said instruction to include one or more second operations for writing the non-zero value to the storage, the one or more second operations being different from the first operation, and
execution circuitry to perform the determined sequence of operations.

2. An apparatus according to claim 1, wherein the first operation is an operation to write a given number of zeroes to a location in the storage, the location being identified in the instruction.

3. An apparatus according to claim 2, wherein the first operation is a zero-by-virtual-address, ZVA, operation.

4. An apparatus according to claim 3, wherein:
the execution circuitry comprises zero-by-virtual address, ZVA, circuitry optimised to perform ZVA operations; and
the execution circuitry is configured to perform the first operation using the ZVA circuitry.

5. An apparatus according to claim 2, wherein the first operation is an optimised operation for writing zeroes.

6. An apparatus according to claim 1, wherein the instruction implementation circuitry is responsive to the given data having a non-zero value to not include the first operation in the sequence of operations.

7. An apparatus according to claim 1 wherein:
the value of zero is equal to a series of one or more zeroes, with no non-zero bits; and
the non-zero value comprises a series of bits, at least one said bit being non-zero.

8. An apparatus according to claim 1, wherein:
the first operation has a first maximum write size, corresponding to a maximum number of zero bits that can be written by a single instance of the first operation;
the one or more second operations have a second maximum size, corresponding to a maximum number of bits that can be written by a single instance of the one or more second operations; and
the first maximum write size is larger than the second maximum write size.

9. An apparatus according to claim 1, wherein:
the instruction implementation circuitry is configured to determine the sequence of operations responsive to a predicate of the given data value, such that the sequence of operations includes the first operation if the given data is predicted to have a value of zero, or includes the one or more second operations if the given data is predicted to have a non-zero value; and
the execution circuitry is configured to initiate performing the determined sequence of operations prior to a determination of the given data value.

10. An apparatus according to claim 9, wherein the apparatus is responsive to a determination that the given data value is not equal to the predicted data value to:
cease, by the execution circuitry, performing the determined sequence of operations;
determine, by the instruction implementation circuitry, a corrected sequence of operations; and
perform, by the execution circuitry, the corrected sequence of operations.

11. An apparatus according to claim 1, wherein the instruction is a memset instruction.

12. An apparatus according to claim 1, wherein the instruction is a FEAT_MOPS instruction.

13. An apparatus according to claim 1, wherein each said operation comprises one or more micro-operations.

14. A method comprising:
receiving an instruction to be executed, the instruction being an instruction identifying given data to be written to a storage;
determining a sequence of operations corresponding to said instruction, said determining comprising:
responsive to the given data identified by said instruction having a value of zero, determining the sequence of operations corresponding to said instruction to include a first operation for writing one or more zeroes to the storage, the first operation being a dedicated zero-writing operation; and
responsive to the given data identified by said instruction having a non-zero value, determining the sequence of operations corresponding to said instruction to include one or more second operations for writing the non-zero value to the storage, the one or more second operations being different from the first operation, and
performing the determined sequence of operations.

15. A non-transitory computer-readable medium to store computer-readable code for fabrication of an apparatus comprising:
instruction receiving circuitry to receive an instruction to be executed, the instruction being an instruction identifying given data to be written to a storage;

instruction implementation circuitry to determine a sequence of operations corresponding to said instruction, wherein the instruction implementation circuitry is configured to:

responsive to the given data identified by said instruction having a value of zero, determine the sequence of operations corresponding to said instruction to include a first operation for writing one or more zeroes to the storage, the first operation being a dedicated zero-writing operation; and responsive to the given data identified by said instruction having a non-zero value, determine the sequence of operations corresponding to said instruction to include one or more second operations for writing the non-zero value to the storage, the one or more second operations being different from the first operation, and execution circuitry to perform the determined sequence of operations.

* * * * *